US012583335B2

(12) United States Patent　　　(10) Patent No.: US 12,583,335 B2
Gorski　　　　　　　　　　　　　　　(45) Date of Patent: Mar. 24, 2026

(54) APPARATUS COMPRISING AN INVERTER

(71) Applicant: THERMO KING LLC, Minneapolis, MN (US)

(72) Inventor: Matthias Gorski, Bochum (DE)

(73) Assignee: THERMO KING LLC, Minneapolis, MN (US)

( * ) Notice: Subject to any disclaimer, the term of this patent is extended or adjusted under 35 U.S.C. 154(b) by 46 days.

(21) Appl. No.: 18/419,701

(22) Filed: Jan. 23, 2024

(65) Prior Publication Data

US 2024/0286493 A1　　　Aug. 29, 2024

(30) Foreign Application Priority Data

Feb. 28, 2023　(EP) .................................... 23159027

(51) Int. Cl.
　*B60L 50/51*　　　　(2019.01)
　*H02J 3/32*　　　　(2006.01)
　*H02J 3/36*　　　　(2006.01)
(52) U.S. Cl.
　CPC .............. *B60L 50/51* (2019.02); *H02J 3/322* (2020.01); *H02J 3/36* (2013.01); *B60L 2210/42* (2013.01); *H02J 2310/48* (2020.01)
(58) Field of Classification Search
　CPC .... B60L 50/51; B60L 2210/42; H02J 2310/48
　USPC ........................................................ 307/10.1
　See application file for complete search history.

(56) References Cited

U.S. PATENT DOCUMENTS

2016/0204691 A1　7/2016　Okuda et al.
2018/0278193 A1*　9/2018　Gurkaynak ............. H02S 40/32

FOREIGN PATENT DOCUMENTS

EP　　　　3362867　　　8/2018
WO　　2017/066307　　4/2017

OTHER PUBLICATIONS

Extended European Search Report, issued in the corresponding European patent application No. 23159027.4, dated Jul. 20, 2023, 10 pages.
Boldea et al., "Scalar V/f and I-f Control of AC Motor Drives: An Overview", IEEE, 2015, 10 pages.

* cited by examiner

*Primary Examiner* — Daniel Kessie
*Assistant Examiner* — Dru M Parries
(74) *Attorney, Agent, or Firm* — HSML P.C.

(57) ABSTRACT
The present disclosure relates to an apparatus comprising a controller, an inverter, a load and a DC link. The DC link is coupled to the load and couplable to a power source. The load comprises an AC electrical component. The inverter is configured to provide an output voltage and an output current to the AC electrical component, the output voltage having an output frequency. The controller is configured to: evaluate a component startup criterion relating to whether the AC electrical component is performing a startup process; in response to a determination that the component startup criterion has been met, operate the inverter in a protected startup mode; and when operating the inverter in the protected startup mode, control the output frequency such that the output frequency increases with time until the output frequency reaches a predefined operating frequency.

21 Claims, 7 Drawing Sheets

300

362

306

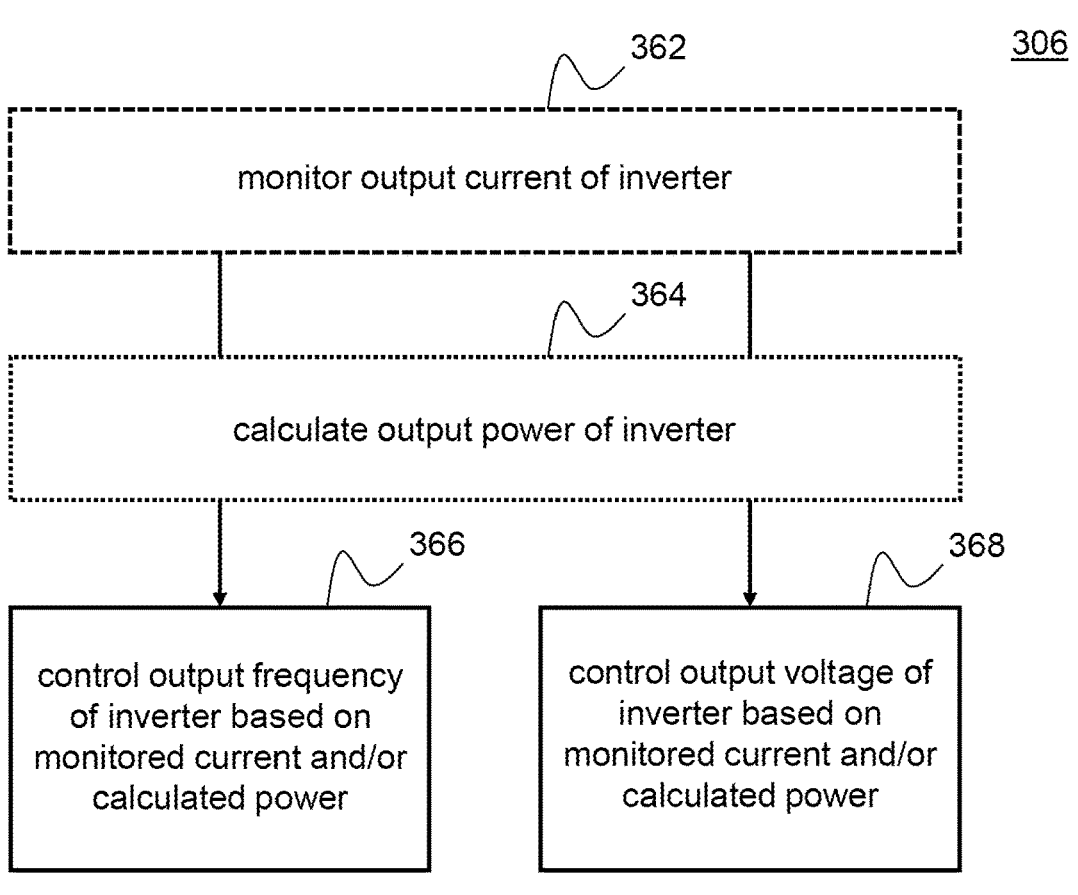

monitor output current of inverter

364 calculate output power of inverter

366 control output frequency of inverter based on monitored current and/or calculated power

368 control output voltage of inverter based on monitored current and/or calculated power

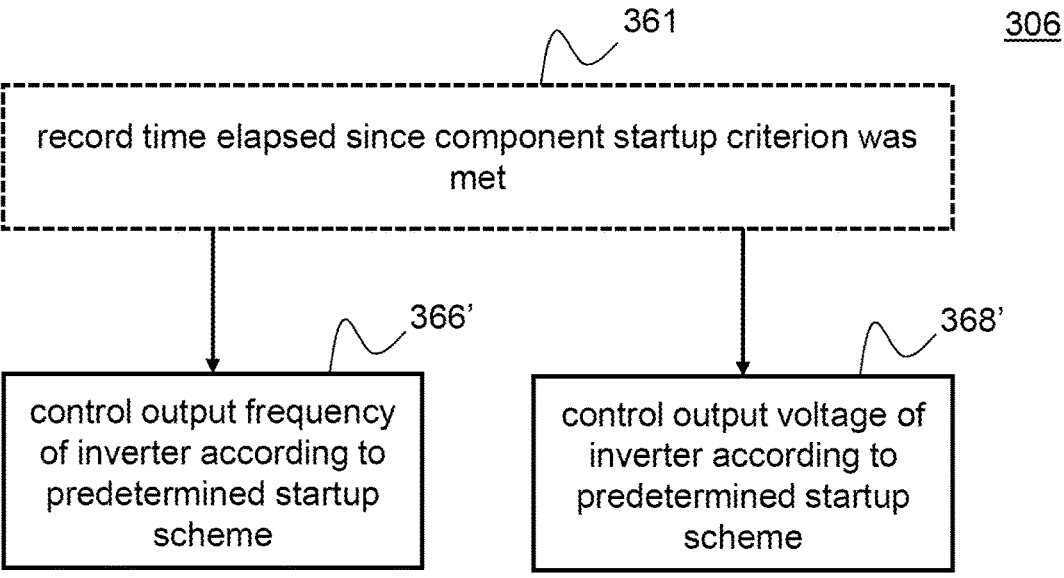

record time elapsed since component startup criterion was met

366' control output frequency of inverter according to predetermined startup scheme

368' control output voltage of inverter according to predetermined startup scheme

FIG. 8

APPARATUS COMPRISING AN INVERTER

FIELD

The present disclosure relates to an apparatus comprising a controller, a load, a battery and a DC link. The load includes an inverter and an AC electrical component. The controller is configured to operate the inverter in a protected startup mode in which an output frequency of the inverter is controlled in response to a determination that a component startup criterion has been met. The present disclosure also relates to a transport refrigeration system comprising such an apparatus.

BACKGROUND

It is known for a transport refrigeration unit (TRU) to comprise at least one mechanical device, such as a compressor, which is configured to be driven by an electrical component, such as a motor, which requires a supply of electrical power for operation (that is, to drive the mechanical device of the TRU). The compressor may form a part of a vapour-compression refrigeration circuit of the TRU.

A TRU may generally be configured to perform a startup routine which requires the electrical component to perform a startup process so as to begin driving the mechanical device. For example, the TRU may commence the startup routine in response to a demand to provide heating or cooling to a climate-controlled space of a transport refrigeration system comprising the TRU.

It is desirable to provide an improved apparatus for supplying electrical power to an electrical component during a startup process of the electrical component. In particular, it is desirable to provide an apparatus which is configured to supply electrical power to an electrical component for performing a startup process such that the electrical component is able to quickly complete the startup process while minimising a risk of damage to other components of the apparatus.

SUMMARY

According to a first aspect, there is provided an apparatus comprising a controller, an inverter, a load and a DC link, wherein: the DC link is coupled to the inverter and couplable to a power source; the load comprises an AC electrical component; the inverter is configured to provide an output voltage and an output current to the AC electrical component, the output voltage having an output frequency; the controller is configured to: evaluate a component startup criterion relating to whether the AC electrical component is performing a startup process, in response to a determination that the component startup criterion has been met, operate the inverter in a protected startup mode, and when operating the inverter in the protected startup mode, control the output frequency such that the output frequency increases with time until the output frequency reaches a predefined operating frequency.

It may be that the controller is configured to: in response to a determination that the component startup criterion has not been met, operate the inverter in a non-startup mode, and when operating the inverter in the non-startup mode, control the output frequency such that the output frequency is equal to a non-startup frequency, wherein the non-startup frequency is equal to the predefined operating frequency.

It may also be that, when operating the inverter in the protected startup mode, the controller is operative to: control the output voltage such that the output voltage increases with time until the output frequency reaches the predefined operating frequency.

Further, it may be that, when operating the inverter in the protected startup mode, the controller is operative to: control the output voltage based on the output frequency. Controlling the output voltage based on the output frequency may include controlling the output voltage such that the output voltage is a function of the output frequency. Controlling the output voltage based on the output frequency may include controlling the output voltage such that the output voltage varies in proportion to the output frequency.

It may be that, when operating the inverter in the protected startup mode, the controller is operative to: monitor the output current of the inverter, control the output frequency, and optionally also control the output voltage, based on the monitored output current.

In addition or instead, it may be that, when operating the inverter in the protected startup mode, the controller is operative to: monitor the output current of the inverter, control the output frequency, and optionally also control the output voltage, to maintain the monitored output current at or below an upper output current threshold. The upper output current threshold my be no greater than 50 A. When operating the inverter in the protected startup mode, the controller may be operative to: control the output frequency, and optionally also control the output voltage, to maintain the monitored output current at or below the upper output current threshold and within a target output current range of the upper output current threshold.

In addition or instead, it may be that, when operating the inverter in the protected startup mode, the controller is operative to: monitor the output current of the inverter; calculate an output power (e.g., a total output power or a real/active output power) based on the output voltage and the monitored output current; and control the output frequency, and optionally also control the output voltage, to maintain the calculated output power at or below an upper output power threshold. The upper output power threshold may be no greater than 15 KW. When operating the inverter in the protected startup mode, the controller may be operative to: control the output frequency, and optionally also control the output voltage, to maintain the calculated output power at or below the upper output power threshold and within a target output power range of the upper output power threshold.

When operating the inverter in the protected startup mode, the controller may be operative to: record a time elapsed since the component startup criterion was determined to have been met; and control the output frequency, and optionally also control the output voltage, according to a predetermined startup scheme which defines a relationship between: the output voltage and the recorded time elapsed, and the output frequency and the recorded time elapsed.

It may be that the relationship between the output voltage and the recorded time elapsed defined by the predetermined startup scheme is such that the output voltage increases as the time elapsed increases. It may also be that the relationship between the output frequency and the recorded time elapsed defined by the predetermined startup scheme is such that the output frequency increases as the time elapsed increases.

The controller may be configured to: monitor the output current of the inverter; compare the monitored output current to a startup output current threshold; and determine that the component startup criterion has been met if the monitored output current exceeds the startup output current threshold.

Additionally or alternatively, the controller may be configured to: monitor the output current of the inverter; calculate a rate of change of the monitored output current; compare the calculated rate of change of the monitored output current to a startup output current rate of change threshold; and determine that the component startup criterion has been met if the calculated rate of change of the monitored output current exceeds the startup output current rate of change threshold.

Otherwise, the controller may be configured to: receive a startup signal; and determine whether the component startup criterion has been met based on the startup signal.

It may be that the apparatus comprises a power converter, with the DC link being couplable to the power source via the power converter. The power converter may be a rectifier. The AC electrical component may be an asynchronous electrical machine.

According to a second aspect there is provided a transport refrigeration system comprising the apparatus according to the first aspect, wherein the AC electrical component is configured to drive a compressor of the transport refrigeration system.

BRIEF DESCRIPTION OF THE DRAWINGS

FIG. 7 is a flowchart which shows a first example implementation of a process of operating the inverter of FIG. 3 in a protected startup mode, as part of the method shown in FIG. 4; and FIG. 8 is a flowchart which shows a second example implementation of a process of operating the inverter of FIG. 3 in a protected startup mode, as part of the method shown in FIG. 4.

DETAILED DESCRIPTION OF THE INVENTION

Figure 1:
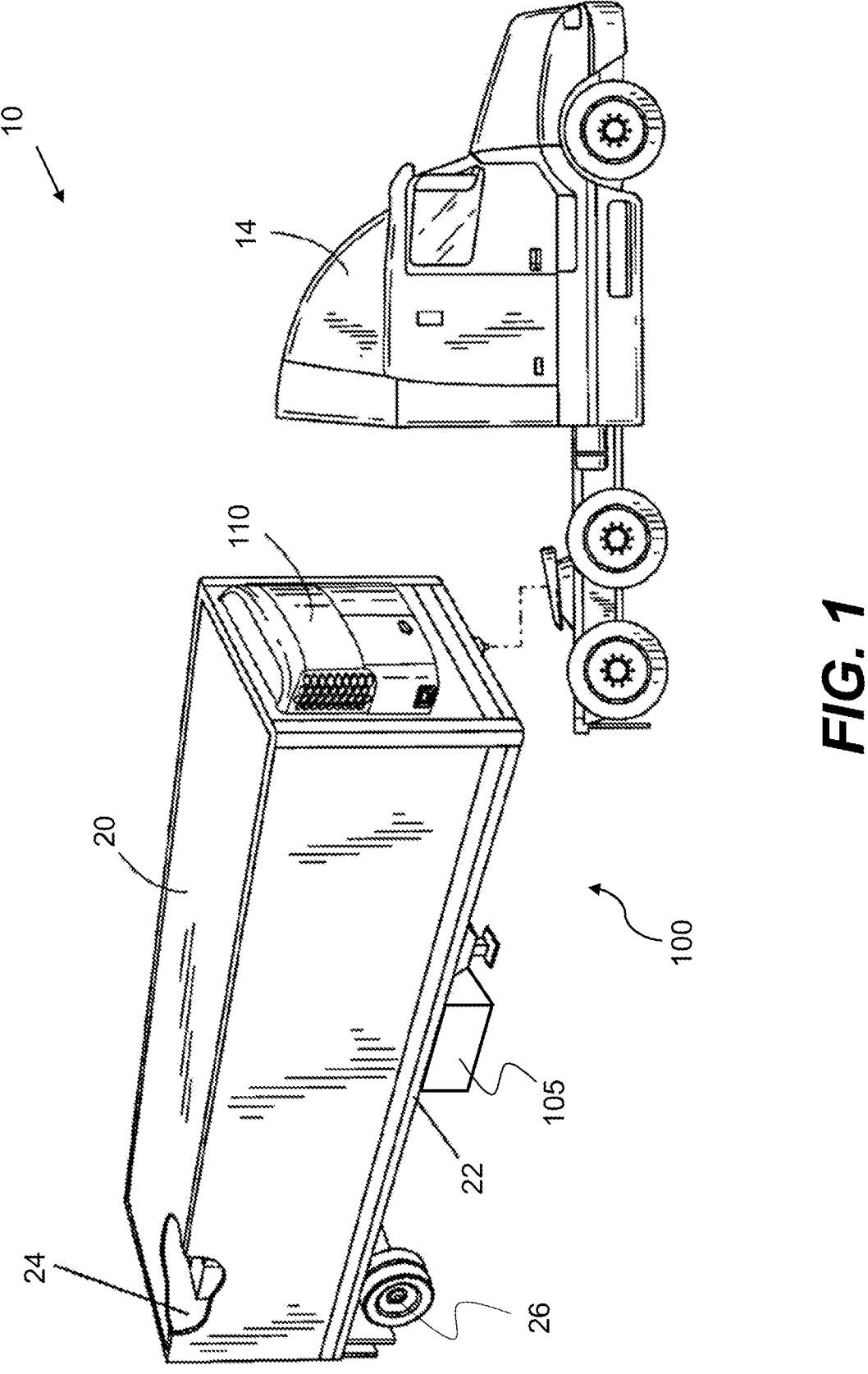
FIG. 1 shows a vehicle comprising a transport refrigeration system.

FIG. 1 shows a vehicle 10 comprising a transport refrigeration system 20. In the example of FIG. 1, the transport refrigeration system 20 is an over-the-road refrigerated semi-trailer 20 having a structure 22 supporting (or forming) a single climate-controlled compartment 24 which is configured to be cooled and/or heated by a TRU 110. The structure 22 includes a chassis. The vehicle 10 comprises an apparatus 100 which includes various components disposed within an under-chassis box 105. In some examples, one or more components of the apparatus 100 may be integrated or incorporated into the TRU 110. The structure 22 supports the TRU 110 and the under-chassis box 105. The vehicle 10 further comprises a tractor unit 14 removably couplable to the trailer 20. The vehicle 10 comprises at least an axle 26, to which an electrical generator as described below with reference to FIG. 2 may be mechanically coupled. Although the axle 26 is shown as being provided as part of the over-the-road refrigerated semi-trailer 20 in the example of FIG. 1, this need not be the case. For instance, it may be that the axle 26 is provided as part of the tractor unit 14.

Figure 2:
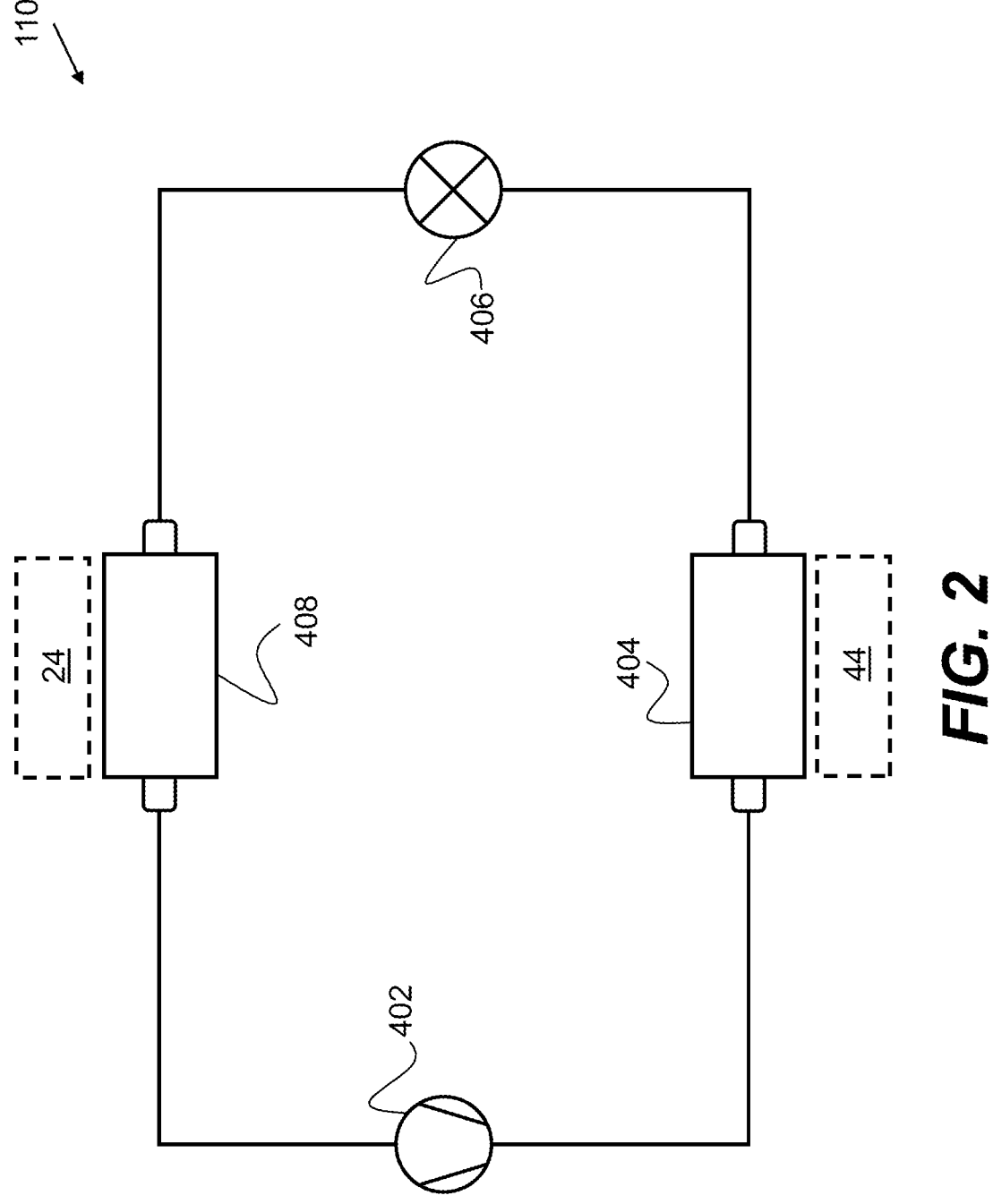
FIG. 2 is a diagram which schematically shows a transport refrigeration unit suitable for use with the transport refrigeration system of FIG. 1.

FIG. 2 schematically shows a diagram of an example TRU 110 suitable for use within the vehicle 10 and the transport refrigeration system 20 of FIG. 1. The TRU 110 comprises a vapour-compression refrigeration circuit 400. The vapour-compression refrigeration circuit 400 includes an evaporator 408 which is configured to receive heat from the climate-controlled compartment 24 of the transport refrigeration system 20 and a condenser 404 which is configured to reject heat to a thermal sink 44 (e.g., ambient air outside of the climate-controlled compartment 24). For these purposes, the vapour-compression refrigeration circuit 400 also includes a compressor 402 and an expansion valve 406. Accordingly, the vapour-compression refrigeration circuit 400 may be controlled to cause heat to be removed from the climate-controlled compartment 24. The vapour-compression refrigeration circuit 400 may be controlled by any number of suitable control methods, as will be apparent to those skilled in the art.

Figure 3:
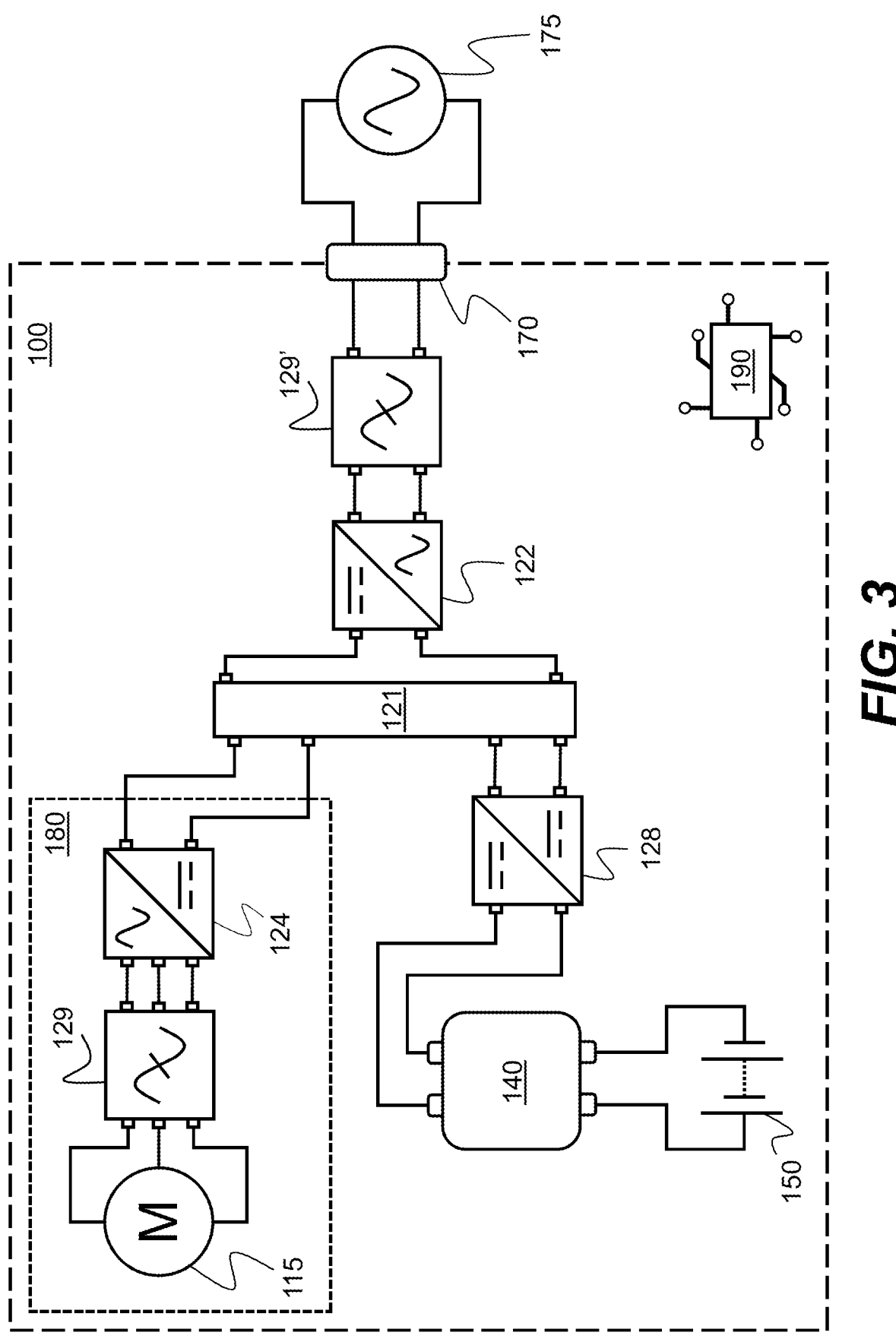
FIG. 3 is a diagram which shows an example apparatus suitable for use with the transport refrigeration system of FIG. 1, the apparatus comprising an inverter.

FIG. 3 shows a diagram of an example apparatus 100 suitable for use with a transport refrigeration system 20 comprising a transport refrigeration unit (TRU) 110. The apparatus 100 may be incorporated within a mobile climate-controlled module including a climate-controlled compartment, such as the transport refrigeration system 20 and the climate-controlled compartment 24 shown in FIG. 1. Accordingly, the apparatus 100 is generally configured for use in transit.

The apparatus 100 comprises a DC link 121, a rectifier 122 and a load 180 comprising an electrical component 115. The load 180 may generally be considered to comprise any suitable combination of a resistive load, an inductive load and/or a capacitive load. In the example of FIG. 2, the load 180 comprises an inverter 124 and an AC electrical component 115. However, this disclosure envisages that the load 180 may only comprise the AC electrical component 115 while the inverter 124 does not form a part of the load 180 (as such). The apparatus 100 further comprises a controller 190. The controller 190 is generally configured to operate the apparatus 100 in accordance with the method described below with reference to FIG. 4. The controller 190 may be provided as part of (e.g., disposed within or on), the inverter 124. If so, the inverter 124 may be referred to as being configured to operate the apparatus 100 in accordance with the method described below with reference to FIG. 4.

The electrical component 115 is configured to drive a mechanical device. By way of example, the mechanical device may be a fan, a pump or a compressor of the transport refrigeration system 20. In particular, the electrical component 115 may be a motor 115 which is configured to drive the compressor 402 of the vapour-compression refrigeration circuit 400 of the TRU 110. More particularly, the motor 115 may be an AC asynchronous motor 115 (which may also be referred to as an induction motor 115). In the example of FIG. 2, the motor 115 is a three-phase AC motor 115.

An output of the rectifier 122 is electrically coupled to the DC link 121 and an input of the inverter 124 is also electrically coupled to the DC link 121. Thus, the DC link 121 is coupled to the load 180. An input of the rectifier 122 is electrically couplable to an AC power source external 175 to the apparatus 100 at a connection port 170 of the apparatus 100. Thus, the DC link 121 is coupled to the load 180 via the inverter 124 as well as being couplable to the AC external power source 175 at the external connection port 170 via the rectifier 122.

The external power source 175 is external to the apparatus 100 in the sense that any electrical energy storage capacity or electrical energy generation capacity of the external power source 175 is not disposed within the apparatus 100. Generally, the external AC power source 175 may be connected at the connection port 170 when the apparatus 100 is stationary (that is, not in transit), whereas the external AC power source 175 is not connected at the connection port 170 when the apparatus 100 is in transit (that is, not stationary). The external AC power source 175 may be, as a particular example, an electrical grid such as a public or a private electrical grid. The external power source 175 may otherwise be, as a further particular example, a mobile external electrical system such as an electrical system of the tractor unit 14 which is accessible through a power take-off. When connected at the connection port 170, the external AC power source 175 has an associated power capability.

An output of the inverter 124 is electrically couplable to the AC motor 115 of the load 180. The rectifier 122 and/or the inverter 124 may comprise one or more power switching components. Each power switching component may include, for example, an insulated gate bipolar transistor (IGBT), a junction-gate field-effect transistor (JFET), a thyristor, and/or a metal-oxide-semiconductor field-effect transistor (MOSFET). In particular, each power switching component may include a gate turn-off thyristor (GTO) and/or an integrated gate-commutated thyristor (IGCT).

In use, the rectifier 122 receives an AC input power supplied to its input (e.g., from the external AC power source 175) and converts it into a DC output power which is then supplied to the DC link 121 via the output of the rectifier 122. Conversely, the inverter 124 receives a DC input power supplied to its input by the DC link 121 and converts it into an AC output power, suitable for supplying the AC electrical component 115. Specifically, the inverter 124 is configured to provide an AC output voltage and an AC output current to the AC electrical component 115. The AC output voltage is defined by (e.g., has) a periodic frequency, which may be referred to as the AC output frequency of the inverter 124.

The apparatus 100 may comprise a power distribution unit (PDU) 140 electrically coupled to the DC link 121. If present, the PDU 140 is generally configured to act as an interface between the DC link 121 and a variety of other electrical components of the apparatus 100 which may be electrically coupled to the PDU 140 (e.g., a battery, as discussed below). The PDU 140 may comprise at least one thermal fuse, such that the PDU is able to rapidly decouple the DC link 121 from any components of the apparatus 100 which are electrically coupled to the PDU 140 if a fault current develops within the apparatus 100.

The PDU 140 has a nominal or rated operating voltage. Therefore, any DC electrical voltages which are supplied to the PDU 140 from any electrical components of the apparatus 100 which are electrically coupled to the PDU 140 (including the DC link 121) should match the operating voltage of the PDU. Likewise, any DC electrical voltages which are provided to the PDU 140 from any electrical components of the apparatus 100 which are electrically coupled to the PDU 140 (including the DC link 121) should match the operating voltage of the PDU. The operating voltage of the PDU 140 may be determined according to a voltage of an electrical component of the apparatus 100 which is electrically coupled to the PDU 140.

Further, the apparatus 100 includes a battery 150 which is electrically coupled to the PDU 140. Hence the DC link 121 is couplable to the battery 150 via the PDU 140. Accordingly, the PDU 140 is able to isolate the DC link 121 from the battery 150 to protect the battery 150 from electrical faults originating in another part of the apparatus 100 and vice versa. In such examples, the operating voltage of the PDU 140 corresponds to a voltage of the battery 150. The battery 150 may have a nominal voltage or a rated voltage, which varies according to a state-of-charge (SOC) of the battery 150. If the operating voltage of the PDU 140 is within an acceptable range of the voltage of the battery 150, the battery 150 may be charged (from the DC link 121) and/or discharged (into the DC link 121) via the PDU 140. In use, the battery 150 may function as either an internal DC power source or an internal DC power sink, depending on whether it is being discharged or charged, respectively. The battery 150 is internal to the apparatus 100 (i.e., is an internal power source or an internal power sink) in the sense that the electrical energy storage capacity of the battery 150 is disposed within the apparatus 100.

Additionally, the apparatus 100 may comprise a DC-DC converter 128 coupled between the DC link 121 and the PDU 140 and operative to convert a DC voltage at a second magnitude supplied to the DC-DC converter 128 by the PDU 140 to a DC voltage at a first magnitude for supply to the DC link 121, and to convert a DC voltage at the first magnitude supplied to the DC-DC converter 128 by the DC link 121 to a DC voltage at the second magnitude for supply to the PDU 140. If so, the DC link 121 is coupled to or couplable to the battery 150 via the PDU 140 and the DC-DC converter 128. The DC-DC converter 128 may include a low-pass filter for removing high-frequency variations (e.g., high frequency components arising due to switching of the DC-DC converter) in the electrical power supplied by the DC-DC converter 128. The DC-DC converter 128 may comprise at least one galvanic isolation device, such that the DC-DC converter 128 is able to selectively isolate the PDU 140 from the DC link 121, for example in response to the development of a fault current between the PDU 140 and the DC link 121 for improved safety of the apparatus 100. The DC-DC converter 128 allows the operating voltages of the DC link 121 and the PDU 140, respectively, to be dissimilar. Specifically, the inclusion of the DC-DC converter 128 allows the operating voltage of the DC link 121 to be significantly greater than the operating voltage of the PDU 140 and also allows the operating voltage of the PDU 140 to freely vary as the voltage of the battery 150 varies without having any adverse effects on effective operation of the apparatus 100.

Depending on whether the battery 150 is being charged or discharged, the DC-DC converter 128 performs different functions. When the battery 150 is being charged, the DC-DC converter 128 converts the voltage supplied from the DC link 121 at the operating voltage of the DC link 121 (that is, a voltage having the first voltage magnitude) to a voltage for supply to the PDU 140 at the operating voltage of the PDU 140 (that is, a voltage having the second voltage magnitude, the first voltage magnitude being greater than the second voltage magnitude). Otherwise, when the battery 150 is being discharged, the DC-DC converter 128 converts the voltage supplied from the PDU 140 at the operating voltage of the PDU 140 (that is, a voltage having the second voltage magnitude) to a voltage for supply to the DC link 121 at the operating voltage of the DC link 121 (that is, a voltage having the first voltage magnitude). Accordingly, the DC-DC converter 128 may be considered to be a buck-boost DC-DC converter. The DC-DC converter 128 may comprise a variety of electrical components required in order to function as a buck-boost DC-DC converter, as will be apparent to those skilled in the art.

The first voltage magnitude is the magnitude of the operating voltage of the DC link 121. In order to ensure that the inverter 124 is able easily to provide an AC power output which meets the required voltage for the AC electrical power to be provided to the load 180 across a broad range of operating conditions, the operating voltage of the DC link 121 (and therefore the first voltage magnitude) may be selected so as to be in a range between 600 VDC and 800 VDC. Preferably, the operating voltage of the DC link 121 may be approximately 700 VDC. The second voltage magnitude is the magnitude of the operating voltage of the PDU 140, which in turn corresponds to the output/terminal voltage of the battery 150. Depending on the SOC of the battery 150, the second voltage magnitude may typically vary within a range between 300 VDC and 450 VDC.

As shown in the example apparatus 100 of FIG. 2, the output of the inverter 124 may be electrically couplable to the AC electrical component 115 via an output sine-wave filter 129. The output sine-wave filter 129 is generally configured to increase a degree to which a time-domain profile of an AC electrical power supplied to the AC electrical component 115 in use conforms to a substantially sinusoidal profile. To this end, it may be that the output sine-wave filter 129 comprises a low-pass filter configured to attenuate high frequency components (i.e., components above an upper threshold frequency) of the AC electrical power that is supplied to the AC electrical component 115 in use, such that the time-domain profile of the AC electrical power supplied to the AC electrical component 115 is primarily composed of frequency components below the upper-frequency threshold, which in turn results in an increase in the degree to which the time-domain profile of an AC electrical power supplied to the AC electrical component 115 conforms to a substantially sinusoidal profile. In addition to the low-pass filter, the output sine-wave filter 129 may comprise a high-pass filter configured to attenuate any low frequency components (i.e., components below a lower frequency threshold) of the AC electrical power that is supplied to the AC electrical component 115 in use, such that the time-domain profile of the AC electrical power supplied to the AC electrical component 115 is primarily composed of frequency components between the lower-frequency threshold and the upper-frequency threshold. This may further increase the degree to which the time-domain profile of an AC electrical power supplied to the AC electrical component 115 conforms to a substantially sinusoidal profile. As will be appreciated by those of ordinary skill in the art, equivalent functionality can be achieved through the use of a band pass filter, configured with a suitable pass band, as the output sine-wave filter 129.

It may be that for optimal operation, the AC electrical component 115 should receive a supply of an AC electrical power supply having a substantially sinusoidal time-domain profile is beneficial. However, it may be that a time-domain profile of an AC electrical power provided by the output of the inverter 124 is substantially non-sinusoidal. For instance, the time-domain profile of the AC electrical power provided by the output of the inverter 124 may substantially conform to a rectangular or square wave, or another non-sinusoidal wave. Electrical coupling of the output of the inverter 124 to the AC electrical component 115 via the output sine-wave filter 129 increases the conformity of the time-domain profile of the AC electrical power provided to the AC electrical component 115 to a substantially sinusoidal profile, and therefore enables more effective operation of the AC electrical component 115.

As also shown in the example apparatus 100 of FIG. 2, the input of the rectifier 122 may be electrically couplable to the external AC power source 175 at the connection port 170 via an input filter 129'. The input filter 129' is generally configured to remove noise from an AC electrical power supplied to the rectifier 122. For this purpose, the input filter 129' may comprise at least one low-pass filter as described above with respect to the output sine-wave filter 129. It may be that the operation of rectifier 122 is improved when the supply of AC electrical power does not contain a significant amount of noise. The input filter 129' may therefore enable more effective operation of the rectifier 122.

It will be appreciated that in other examples, the output of the inverter 124 is not electrically couplable to the AC electrical component 115 via the output sine-wave filter 129 and/or the input of the rectifier 122 is not electrically couplable to the external AC power source via the input filter 129'.

Moreover, although it has been described that the apparatus 100 is configured to receive an AC electrical power from an AC external power source 175, this need not necessarily be the case. For example, it may be that the apparatus 100 is configured to receive a DC electrical power from a DC external power source 175. If so, the rectifier 122 may be replaced with an additional DC-DC converter to provide a suitable interface between the external power source 175 and the DC link 121. The alternatives of the rectifier 122 and the additional DC-DC converter both provide power conversion functionality between the DC link 121 and the external power source 175. Therefore, either the rectifier 122 or the additional DC-DC converter may be referred to as a power converter 122. References herein to the power converter 122 should be understood as referring to either the rectifier 122 (in the case of the apparatus 100 being configured to receive an AC electrical power from an AC external power source 175) or the additional DC-DC converter (in the case of the apparatus 100 being configured to receive a DC electrical power from a DC external power source 175) as applicable and appropriate.

Further, while it has been described that the apparatus 100 may comprise a PDU 140 electrically coupled to the DC link 121, this need not necessarily be the case. For instance, it may be that the battery 150 is electrically coupled to the DC link 121 (e.g., via the DC-DC converter 128 but not via the PDU 140). Otherwise, it may be that the apparatus 100 does not comprise a battery.

Figure 4:
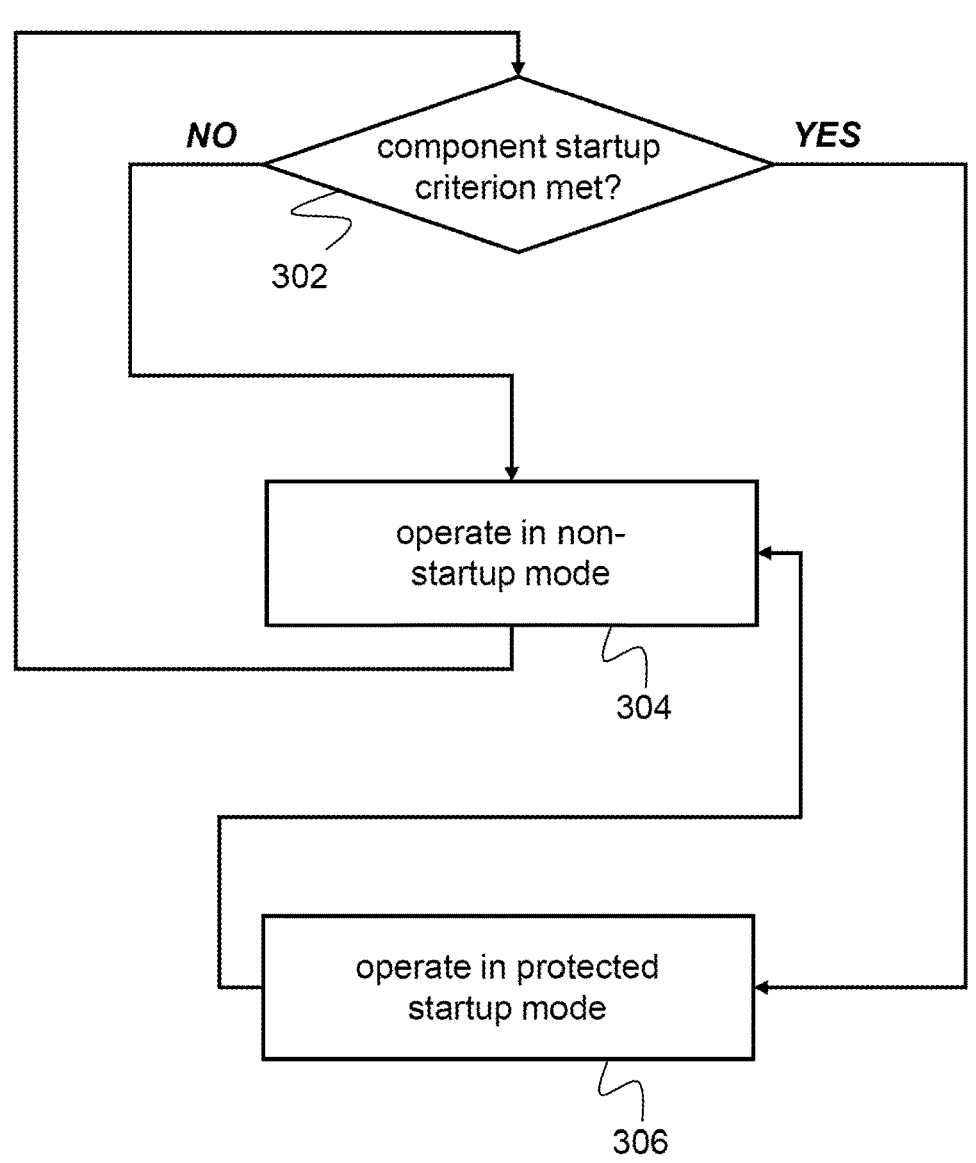
FIG. 4 is a flowchart which shows an example method of operating the example apparatus of FIG. 3.

FIG. 4 is a flowchart which shows an example method 300 of operating the apparatus 100. As discussed above, the method 300 is generally implemented by the controller 190. The method 300 comprises a process of evaluating (at block 302) a component startup criterion. In response to a determination (in block 302) that the component startup criterion has not been met, the method 300 continues to a process of operating (at block 304) the inverter 124 in a non-startup mode, before the method 300 returns to the process of evaluating (at block 302) the component startup criterion such that the component startup criterion is repeatedly re-evaluated until a determination (in block 302) is made that the component startup criterion has been met. In response to a determination (in block 302) that the component startup criterion has been met, the method 300 continues to a process of operating (at block 306) the inverter 124 in a protected startup mode.

In broad terms, when operating the inverter 124 in the non-startup mode (at block 304), the controller 190 is operative to maintain the AC output frequency of the inverter 124 as being substantially constant and approximately equal to a non-startup frequency and also to maintain a characteristic magnitude of the AC output voltage of the inverter 124 as being substantially constant and approximately equal to a characteristic magnitude of a non-startup voltage. The characteristic magnitude of each of the AC output voltage of the inverter 124 and the non-startup voltage may be a peak voltage magnitude or a root mean square (rms) voltage magnitude. As will be understood by those skilled in the art, the non-startup frequency determines the speed at which the rotor of the motor 115 rotates when the inverter 124 is operational (at block 304) in the non-startup mode. The non-startup frequency may therefore be selected to correspond to an optimal operating speed at which the mechanical device (e.g., the compressor 402) is configured to be driven by the motor 115 in use. The magnitude of the non-startup voltage may be selected to correspond to a magnitude of an optimal operating voltage of the motor 115, as specified by a manufacturer of the motor 115 or as otherwise determined.

In contrast, when operating the inverter 124 in the protected startup mode (at block 306), the controller 190 is operative to control the AC output frequency of the inverter 124 such that the output frequency increases with time until the AC output frequency reaches a predefined operating frequency. In addition to controlling the AC output frequency of the inverter 124 in this way, the controller 190 may also be operative to control the AC output voltage of the inverter 124 such that the AC output voltage increases with time until the AC output frequency reaches the predefined operating frequency when operating the inverter 124 in the protected startup mode (at block 306). The predefined operating frequency is selected as being equal to the non-startup frequency. When the AC output frequency of the inverter 124 reaches the predefined operating frequency (i.e., the non-startup frequency), the method 300 includes continuing to the process of operating the inverter 124 in the non-startup mode (at block 304) and continues thereafter as described above.

To control the AC output frequency and/or to control the AC output voltage of the inverter 124 during the action of operating (at block 304) the inverter 124 in the non-startup mode of and/or the action of operating (at block 306) the inverter 124 in the protected startup mode, the controller 190 may vary a control regime for at least one internal switching device of the inverter 124. For example, the controller 190 may vary a duty cycle and/or a switching frequency of the at least one internal switching device of the inverter 124, as will be appreciated by those skilled in the art. When operating in either or both the non-startup mode (at block 304) and in the protected startup mode (at block 306), the inverter may generally receive electrical power from the external AC power source 175 via the DC link 121 and the power converter 122. If the apparatus 100 includes a battery 150 as described above, the inverter 124 may also receive electrical power from the battery 150 via the DC link 121 and the DC-DC converter 128 when operating in either or both the non-startup mode (at block 304) and the protected startup mode (at block 306).

The process of evaluating the component startup criterion is described in detail below with reference to FIG. 5.

Specific implementations of the process of operating the inverter 124 in protected startup mode are described in detail with reference to FIGS. 7-8.

Figure 5:
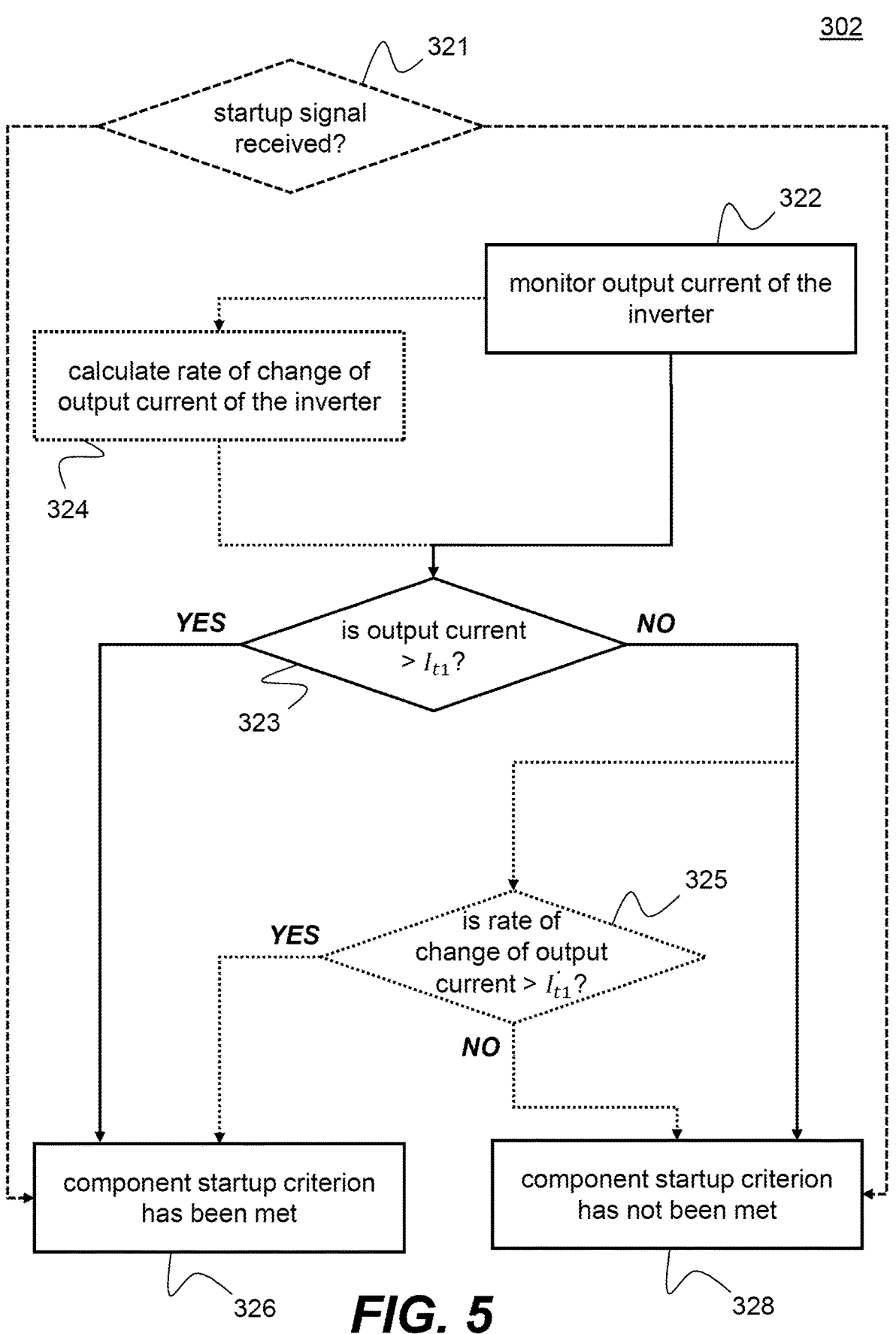
FIG. 5 is a flowchart which shows an example implementation of a process of evaluating a component startup criterion, as part of the method shown in FIG. 4.

FIG. 5 is a flowchart which shows an example implementation of the process of evaluating the component startup criterion, as represented by block 302 in FIG. 4. In general, the component startup criterion relates to whether the electrical component 115 is performing (e.g., undergoing) a startup process.

The controller 190 may be configured to receive a startup signal and to determine whether the component startup criterion has been met based on the startup signal. By way of example, the startup signal may be a signal received from a controller of the TRU 110 indicating that the TRU 110 is about to execute a startup routine which requires the electrical component 115 to perform the startup process and begin driving the mechanical device. For instance, the TRU 110 may commence the startup routine in response to a demand to provide cooling or heating to the climate-controlled compartment 24 of the transport refrigeration system 20. By way of further example, the startup signal may be a signal received from a controller of the electrical component 115 or the mechanical device (e.g., the compressor 402) which the electrical component 115 is configured to drive indicating that the electrical component 115 is required to perform the startup process.

Accordingly, the process of evaluating the component startup criterion may comprise an action of determining (at block 321) whether the startup signal has been received. If the startup signal has been received, the process continues to an action of determining (at block 326) that the component startup criterion has been met. However, if the startup signal has not been received, the process continues to an action of determining (at block 328) that the component startup criterion has not been met.

As discussed above, the electrical component 115 may be an AC asynchronous motor 115 (e.g., an induction motor 115) comprising a rotor and a stator provided with a set of windings. During a startup process of an AC asynchronous motor 155, the rotor of the motor 115 is initially stationary (and subsequently only slowly rotating) while the magnetic field induced in a set of windings provided to the stator is rotating according to a frequency of an electrical voltage provided to the set of windings. As a result, initially no (and subsequently only a small) back electromotive force is induced within the set of windings as the motor 115 performs the startup process. Therefore, the electromotive force within the set of windings may be relatively large and the current drawn by the set of windings of the motor 115 may be correspondingly large. Consequently, the controller 190 may determine that the electrical component 115 is performing the startup process by detecting a transient load current.

To this end, the process of evaluating the component startup criterion may comprise an action of monitoring (at block 322) the AC output current of the inverter 124. If the AC electrical component 115 is a three-phase AC electric motor 115, as in the example of FIG. 3, the action of monitoring (at block 322) the AC output current of the inverter 124 may include monitoring the AC output current of each phase of the AC output power provided to the motor 115 by the inverter 124. The controller 190 may be provided with a current monitoring apparatus (not shown) for the purpose of monitoring the output current of the inverter 124. Suitable current monitoring apparatuses for this purpose will be apparent to those skilled in the art. Optionally, the process of evaluating the component startup criterion may also comprise an action of calculating (at block 324) a rate of change of the monitored output current of the inverter 124. The rate of change of the monitored current drawn may be calculated over a predetermined time-step.

The process of evaluating the component startup criterion then continues to an action of comparing (at block 323) the output current of the inverter 124 (as monitored in block 322) to a startup drawn current threshold, $I_{t1}$.

The startup drawn current threshold is selected as a value of the output current of the inverter 124 (e.g., by the motor 115) representing a transient load current drawn by the motor 115 and hence indicative that the load 180 is performing the startup process.

If it is found that the monitored output current of the inverter 124 exceeds the startup current drawn threshold, $I_{t1}$, as a result of the comparison (at block 323), the process continues to an action of determining (at block 326) that the component startup criterion has been met. On the other hand, if it is found that the monitored output current of the inverter 124 does not exceed the startup current drawn threshold, $I_{t1}$, as a result of the comparison (at block 323), the process may directly continue to an action of determining (at block 328) that the component startup criterion has not been met.

However, if the process of evaluating the component startup criterion comprises the action of calculating (at block 324) the rate of change of the monitored output current of the inverter 124, the process may instead continue to an action of comparing (at block 325) the rate of change of the output current of the inverter 124 (as monitored in block 324) to a startup drawn current rate of change threshold, $I_{t1}'$, after it is found that the monitored output current of the inverter 124 foes not exceed the startup current threshold.

The startup drawn current rate of change threshold is selected as a value of the calculated rate of change of the monitored output current of the inverter 124 (e.g., by the motor 115) which is indicative of a transient load current drawn by the motor 115 from the DC link 121 and hence the load 180 is beginning to perform the startup process. If it is found that the calculated rate of change of the monitored output current of the inverter 124 exceeds startup drawn current rate of change threshold, $I_{t1}'$, as a result of the comparison (at block 325), the process continues to an action of determining (at block 326) that the component startup criterion has been met. On the other hand, if it is found that the calculated rate of change of the monitored output current of the inverter 124 does not exceed the startup drawn current rate of change threshold, $I_{t1}'$, as a result of the comparison (at block 325), the process continues to an action of determining (at block 328) that the component startup criterion has not been met.

Figure 6:
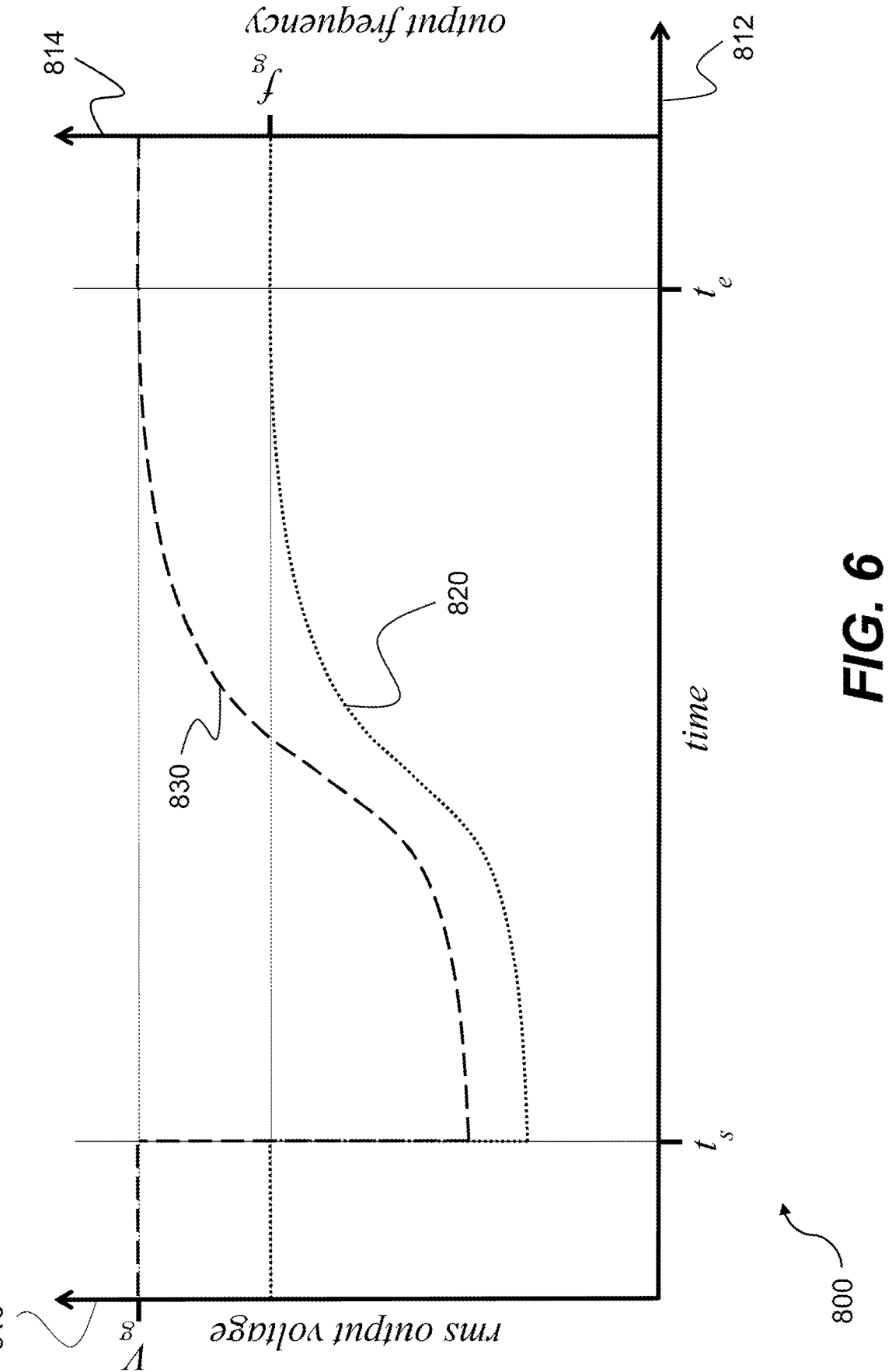
FIG. 6 is a graph which shows an example relationship between an output voltage of the inverter of FIG. 3 and time as well as an example relationship between an output frequency of the inverter of FIG. 3.

FIG. 6 is a graph 800 which shows an example relationship between the AC output voltage of the inverter 124 and time as well as an example relationship between the AC output frequency of the inverter 124 and time while the inverter 124 is operated in each of the non-startup mode (at block 304) and the protected startup mode (at block 306) by the controller 190.

The transient load current drawn by an AC asynchronous electric motor 115 during the startup process is dependent on a plurality of determining factors. A first such determining factor is a geometrical size of the set of windings provided to the stator. A second such determining factor is a resistance of the rotor to being rotated due to, for example, a resistance of the mechanical device (e.g., the compressor 402) to being driven by the motor 115. Another such determining factor is a set of magnetic properties of the motor 115, such as a reluctance of a magnetic circuit formed between the rotor and the stator of the motor 115. An additional such determining factor is a magnitude of the electromotive force applied to the set of windings. A further such determining factor is a difference (e.g., a slip) between the rotational speed of the magnetic field induced in a set of windings provided to the stator (e.g., a synchronous speed) and the rotational speed of the rotor (e.g., a shaft speed). In the example apparatus 100 of FIG. 3, the electromotive force applied to the set of windings of the motor 115 corresponds to the AC output voltage of the inverter 124.

It follows that, by controlling the AC output voltage of the inverter 124, the electromotive force applied to the set of windings of the motor 115 may be controlled. Moreover, the slip between the synchronous speed and the shaft speed may be controlled by varying the AC output frequency of the motor 115. Therefore, by controlling the AC output frequency of the inverter 124, and optionally also controlling the AC output voltage of the inverter 124, the output current of the inverter 124 provided to the motor 115 during the startup process may be effectively managed.

An example relationship 820 between the AC output frequency of the inverter 124 and time as actively controlled by the controller 190 in the protected mode is represented on the graph 800 shown by FIG. 6, in which an x-axis 812 represents a time and a first y-axis 814 represents the AC output frequency of the inverter 124. An example relationship 830 between the rms magnitude of the AC output voltage of the inverter 124 and time as may be actively controlled by the controller 190 when operating the inverter 124 in the protected startup mode is also represented on the graph 800 shown by FIG. 6, in which a second x-axis 816 represents the rms magnitude of the AC output voltage of the inverter 124.

Prior to a determination that the component startup-criterion has been met, at a time $t_s$, the inverter 124 is operated (at block 304) in the non-startup mode. Accordingly, the inverter 124 is controlled such that the rms magnitude of the AC output voltage of the inverter 124 is substantially constant and corresponds to the non-startup voltage, $V_g$, and also such that the AC output frequency of the inverter 124 is equal to the non-startup frequency, $f_g$.

However, when it is determined that the component startup criterion has been met, at the time $t_s$, the inverter 124 is switched into operation (at block 306) in the protected startup mode. Compared to when the inverter 124 was operated in the non-startup mode, both the AC output frequency and the rms magnitude of the AC output voltage of the inverter 124 are suddenly reduced as the inverter 124 is started to be operated (at block 306) in the protected startup mode. However, as a time elapsed since it was determined that the component startup criterion was met increases and the inverter 124 continues to be operated in the protected startup mode, both the AC output frequency and the rms magnitude of the AC output voltage 124 increase with time as a result of the actions of the controller 190 described in further detail below with reference to FIGS. 7 and 8. When the AC output frequency is equal to the non-startup frequency, $f_g$, at a time $t_e$, the inverter 124 is once again operated (at block 304) in the non-startup mode and hence the inverter 124 is controlled such that the output frequency is substantially constant and equal to the non-startup frequency, $f_g$, and such that the rms magnitude of the AC output voltage of the inverter 124 is substantially constant and corresponds to the non-startup voltage, $V_g$.

FIG. 7 is a flowchart which shows a first example implementation of the process of operating the apparatus 100 in the protected startup mode, as represented by block 306 in FIG. 4. The first example implementation of the process of operating (at block 306) the inverter 124 in the protected startup mode includes an action of monitoring (at block 362) the output current of the inverter 124. The action of monitoring (at block 362) the output current of the inverter 124 is generally similar to the action of monitoring the output current of the inverter 124 described above with respect to block 322 and FIG. 5.

The first example implementation of the process of operating (at block 306) the inverter 124 in the protected startup mode may include an action of calculating (at block 364) the AC output power of the inverter 124 based on the monitored output current of the inverter 124 and the AC output voltage of the inverter 124. The AC output power of the inverter 124 may be a real/active AC output power of the inverter 124 or a total AC output power of the inverter 124 (that is, a combination of the real/active AC output power of the inverter 124 and a reactive AC output power of the inverter 124). Accordingly, the AC output power of the inverter 124 may be simply calculated (at block 364) as a product of the monitored AC output current of the inverter and the AC output voltage of the converter in accordance with Ohm's law or otherwise, as will be appreciated by those of ordinary skill in the art. If the AC electrical component 115 is a three-phase AC electric motor 115, as in the example of FIG. 3, the action of calculating (at block 364) the AC output power of the inverter 124 may include calculating the AC output power of each phase provided to the motor 115 by the inverter 124.

The first example implementation of the process of operating (at block 306) the inverter 124 in the protected startup mode may further include an action of controlling (at block 366) the AC output frequency, and optionally also controlling the AC output voltage, of the inverter 124 based on the monitored AC output current. In particular, the action of controlling (at block 366) the AC output frequency, and optionally also controlling the AC output voltage, of the inverter 124 based on the monitored AC output current is to maintain monitored AC output current at or below an upper output current threshold. The upper output current threshold may be a predetermined value which corresponds to a maximum current which the inverter 124 should provide to the AC electrical component 115 during use to avoid damage to the inverter 124 and/or damage to the AC electrical component 115. The upper output current threshold may be selected based on, for example, a maximum current rating of the inverter 124 itself. The maximum current rating of the inverter 124 may in turn be determined by a maximum current rating of the at least internal power switching device of the inverter 124.

If the first example implementation of the process of operating (at block 306) the inverter 124 in the protected startup mode includes the action of calculating (at block 364) the AC output power of the inverter 124, the first example implementation of the process of operating (at block 306) the inverter 124 in the protected startup mode may further include an action of controlling (at block 366) the AC output frequency, and optionally also controlling the AC output voltage (at block 368), of the inverter 124 based on the AC calculated output power (which is, in turn, based on the monitored output current). In particular, the action of controlling (at block 366) the AC output frequency, and optionally also controlling the AC output voltage, of the inverter 124 based on the calculated AC output power is to maintain the calculated AC output power at or below an upper output power threshold. In a similar way to the upper output current threshold, the upper output power threshold may be a predetermined value which corresponds to a maximum power which the inverter 124 should provide to the AC electrical component 115 during use to avoid damage to the inverter 124 and/or damage to the AC electrical component 115. The upper output power threshold may be selected based on, for example, a maximum power rating of the inverter 124 itself. The maximum power rating of the inverter 124 may in turn be determined by a maximum current rating of the at least internal power switching device of the inverter 124.

The upper output current threshold (e.g., the maximum current rating of the inverter 124) may be, for example, no greater than 50 amperes. If employed, the upper output power threshold (e.g., the maximum power rating of the inverter 124) may be, for example, no greater than 15 kilowatts. Use of such values for the respective thresholds may enable a size, weight and/or a complexity of the inverter 124 to be relatively reduced while still enabling the AC electrical component 115 to reliably complete the startup process.

The action of controlling (at block 366) the AC output frequency, and optionally also controlling the AC output voltage, of the inverter 124 based on the monitored AC output current may be to maintain the monitored AC output current at or below the upper output current threshold and also within a target output current range of the upper output current threshold. For example, if the upper output current threshold is no greater than 50 amperes as discussed above, the target output current range may be no greater than, for example, 10 amperes. If so, the action of controlling the AC output frequency, and optionally also controlling the AC output voltage, of the inverter 124 at block 366 results in the controller 190 acting to maintain the monitored AC output current of the inverter 124 between 40 amperes and 50 amperes inclusive.

In a similar way, if the first example implementation of the process of operating (at block 306) the inverter 124 in the protected startup mode includes the action of calculating (at block 364) the AC output power of the inverter 124, the action of controlling (at block 366) the AC output frequency, and optionally also controlling the AC output voltage (at block 368), of the inverter 124 based on the calculated AC output power may be to maintain the calculated AC output power at or below the upper output power threshold and also within a target output power range of the upper output power threshold. For example, if the upper output power threshold is no greater than 15 kilowatts as discussed above, the target output power range may be no greater than, for example, 5 kilowatts. If so, the action of controlling the AC output frequency, and optionally also controlling the AC output voltage, of the inverter 124 at block 368 results in the controller 190 acting to maintain the calculated AC output power of the inverter 124 between 10 kilowatts and 15 kilowatts inclusive.

The actions of controlling (at blocks 366 and 360) the AC output frequency, and optionally the AC output voltage, of the inverter 124 based on the monitored AC output current or the calculated AC output power being to maintain the monitored AC output current or the calculated AC output power, as applicable, within the respective target ranges described above may facilitate shortening of a duration of the startup process of the AC electrical component 115 (e.g. the AC motor 115) by reducing a time taken for the AC output frequency of the inverter to reach the predefined operating frequency. In particular, control of the inverter 124 in this way ensures that the AC output current (and optionally also the AC output power) of the inverter 124 is sufficiently high so that the rotor of the motor 115 is quickly accelerated from stationary to complete the startup process without a significant risk of damage to the inverter 124 and/or the motor 115 as a consequence of an excessive AC output current (and/or an excessive AC output power).

The actions of controlling (at blocks 366 and 368) the AC output frequency, and optionally the AC output voltage, of the inverter 124 based on the monitored output current and/or based on the calculated output power according to the first example implementation of operating (at block 306) the inverter 124 in the protected startup mode result(s) in the AC output frequency and the AC output voltage of the inverter 124 immediately dropping below the non-startup frequency, $f_g$, and the non-startup voltage, $V_g$, respectively, as the AC electrical component 115 (i.e., the AC motor 115) begins the startup process so as to ensure that the monitored AC output current and/or the monitored AC output power of the inverter 124 is maintained below the respective thresholds and within the respective target ranges discussed above. As the rotor of the motor 115 begins to accelerate with time, the back electromotive force within the set of windings provided to the stator of the motor 115 begins to correspondingly increase and so the AC output frequency and/or the AC output voltage of the inverter 124 is/are increased to maintain the monitored AC output current and/or the monitored AC output power of the inverter 124 within the respective target ranges. As a consequence, according to the first example implementation of operating (at block 306) the inverter in the protected startup mode, the AC output frequency and/or the AC output voltage increase with time until the predefined operating frequency (i.e., the non-startup frequency, $f_g$) is reached, as in the respective relationships 820, 830 shown in FIG. 6 between $t_s$ and $t_e$.

FIG. 8 is a flowchart which shows a second example implementation of the process of operating the apparatus 100 in the protected startup mode, as represented by block 306 in FIG. 4. The second example implementation of the process of operating (at block 306) the inverter 124 in the protected startup mode includes an action of recording (at block 361) a time elapsed since the component startup criterion was determined to have been met (at block 302). The recorded time elapsed may then be stored on, for example, a memory of or associated with the controller 190. The second example implementation of the process of operating (at block 306) the inverter 124 in the protected startup mode further includes an action of controlling (at block 366') the AC output frequency of the inverter 124 according to a predetermined startup scheme. The predetermined startup scheme defines a relationship between the AC output frequency of the inverter 124 and the recorded time elapsed. The second example implementation of the process of operating (at block 306) the inverter 124 in the protected startup mode may also further include an action of controlling (at block 368') the AC output voltage of the inverter 124 according to the predetermined startup scheme. If so, the predetermined startup scheme also defines a relationship between the AC output voltage of the inverter 124 and the recorded time elapsed. The predetermined startup scheme may be referred to as a predetermined inverter ramp-up scheme.

The predetermined startup scheme may be derived from computationally-modelled or experimentally-collected data for the apparatus 100 to obtain relationships between the AC output frequency or the AC output voltage of the inverter 124 and the recorded time elapsed which are predicted to enable the startup process to be reliably performed without causing damage to the inverter 124 and/or the AC electrical component 115 (for example, by exceeding a maximum current rating or a maximum power rating of the inverter 124) while also relatively rapidly increasing the AC output frequency of the inverter 124 such that the duration of operating of the inverter 124 in the protected startup mode, and hence the startup process of the AC electrical component 115, is relatively short.

By way of example, the predetermined startup scheme may include at least one analytical equation which relates the recorded time elapsed with the AC output frequency or the AC output voltage which the inverter 124 is to provide when operated (at block 366' and/or at block 368') according to the predetermined startup scheme. By way of further example, the predetermined startup scheme may include at least one numerical model (e.g., a lookup table) which relates the recorded time elapsed with the AC output frequency or the AC output voltage which the inverter 124 is to provide when operated (at block 366) according to the predetermined startup scheme.

The relationship between the AC output frequency and the recorded time elapsed since the component startup criterion was determined to have been met (at block 302) defined by the predetermined startup scheme is such that the AC output frequency increases as the recorded time elapsed increases until the predefined operating frequency (i.e., the non-startup frequency, $f_g$) is reached. Likewise, the relationship between the AC output voltage and the recorded time elapsed since the component startup criterion was determined to have been met (at block 302) defined by the predetermined startup scheme is such that the AC output voltage increases as the recorded time elapsed increases until the predefined operating frequency (i.e., the non-startup frequency, $f_g$) is reached. Consequently, the respective relationships defined by the predetermined startup scheme may generally resemble the corresponding relationships 820, 830 shown in FIG. 6 between $t_s$ and $t_e$.

In either of the alternative example implementations of the process of operating the inverter in the protected startup mode shown in FIGS. 6 and 7, the action of controlling the AC output frequency and also controlling the AC output voltage of the inverter 124 (at blocks 366, 366', 368 and 368') may include controlling the AC output voltage of the inverter 124 based on the AC output frequency of the inverter 124. By way of example, the action of controlling the AC output frequency and also controlling the AC output voltage of the inverter 124 (at blocks 366, 366', 368 and 368') may include controlling both the AC output frequency of the inverter 124 and the AC output voltage of the inverter 124 such that the output voltage is a function of the output frequency. By way of further example, the action of controlling the AC output frequency and also controlling the AC output voltage of the inverter 124 (at blocks 366, 366', 368 and 368') may include controlling both the AC output frequency of the inverter 124 and the AC output voltage of the inverter 124 such that the output voltage varies in direct proportion to the output frequency. This ensures that when the AC output frequency is approximately equal to the non-startup frequency, $f_g$, the AC output voltage is equal to approximately equal to the non-startup voltage, $V_g$. Therefore, the inverter 124 may be returned to being operated in the non-startup mode (at block 304) when the AC output frequency is equal to the non-startup frequency, $f_g$, without resulting in a sudden variation in the AC output voltage of the inverter 124. In turn, this ensures smooth and reliable operation of the AC electrical component 115 (e.g. the AC motor 115) even as the method 300 continues from operating (at block 306) the inverter 124 in the protected startup mode back into the operating (at block 304) the inverter back into the non-startup mode. This also allows the action of controlling the AC output frequency and also controlling the AC output voltage of the inverter 124 (at blocks 366 and 368) to be simply carried out by the controller 190 without recourse to a more complex control scheme.

It should be understood that the processes and actions described with respect to FIGS. 4-5 and FIGS. 7-8 may be performed in any suitable order, and/or that the specific content of each step may be varied while still achieving the desired control outcomes described above.

The controller(s) described herein may comprise a processor. The controller and/or the processor may comprise any suitable circuitry to cause performance of the methods described herein and as illustrated in the drawings. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and or stated functions for which the controller or processor is configured.

The controller or the processor may comprise or be in communication with one or more memories that store that data described herein, and/or that store machine readable instructions (e.g., software) for performing the processes and functions described herein (e.g., determinations of parameters and execution of control routines). The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware or be a combination of software and firmware.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

The invention claimed is:

1. An apparatus comprising:
a controller, an inverter, a load and a DC link, wherein:
the DC link is:
    coupled to the inverter, and
    couplable to a power source;
the load comprises an AC electrical component;
the inverter is configured to provide an output voltage and an output current to the AC electrical component, the output voltage having an output frequency;
the controller is configured to:
    evaluate a component startup criterion relating to whether the AC electrical component is performing a startup process, in response to a determination that the component startup criterion has been met, operate the inverter in a protected startup mode, and
    when operating the inverter in the protected startup mode, control the output frequency such that the output frequency increases with time until the output frequency reaches a predefined operating frequency,
    wherein, when operating the inverter in the protected startup mode, the controller is operative to:
        record a time elapsed since the component startup criterion was determined to have been met; and
        control the output frequency according to a predetermined startup scheme which defines a relationship between:
            the output voltage and the recorded time elapsed, and
            the output frequency and the recorded time elapsed.

2. The apparatus of claim 1, wherein
the controller is configured to:
    in response to a determination that the component startup criterion has not been met, operate the inverter in a non-startup mode; and
    when operating the inverter in the non-startup mode, control the output frequency such that the output frequency is equal to a non-startup frequency, wherein the non-startup frequency is equal to the predefined operating frequency.

3. The apparatus of claim 1, wherein
when operating the inverter in the protected startup mode, the controller is operative to:
    control the output voltage such that the output voltage increases with time until the output frequency reaches the predefined operating frequency.

4. The apparatus of claim 1, wherein
when operating the inverter in the protected startup mode, the controller is operative to:
    control the output voltage based on the output frequency.

5. The apparatus of claim 1, wherein
when operating the inverter in the protected startup mode, the controller is operative to:
    monitor the output current of the inverter;
    control the output frequency based on the monitored output current.

6. The apparatus of claim 1, wherein
when operating the inverter in the protected startup mode, the controller is operative to:
    monitor the output current of the inverter;
    control the output frequency to maintain the monitored output current at or below an upper output current threshold.

7. The apparatus of claim 6, wherein
when operating the inverter in the protected startup mode, the controller is operative to:
    control the output frequency to maintain the monitored output current at or below the upper output current threshold and within a target output current range of the upper output current threshold.

8. The apparatus of claim 1, wherein
when operating the inverter in the protected startup mode, the controller is operative to:
    monitor the output current of the inverter;
    calculate an output power based on the output voltage and the monitored output current; and control the output frequency to maintain the calculated output power at or below an upper output power threshold.

9. The apparatus of claim 8, wherein when operating the inverter in the protected startup mode, the controller is operative to:

control the output frequency to maintain the calculated output power at or below the upper output power threshold and within a target output power range of the upper output power threshold.

10. The apparatus of claim 2, wherein the relationship between:

the output voltage and the recorded time elapsed defined by the predetermined startup scheme is such that the output voltage increases as the time elapsed increases; and the output frequency and the recorded time elapsed defined by the predetermined startup scheme is such that the output frequency increases as the time elapsed increases.

11. The apparatus of claim 1, wherein the controller is configured to:

monitor the output current of the inverter;

compare the monitored output current to a startup output current threshold; and determine that the component startup criterion has been met if the monitored output current exceeds the startup output current threshold.

12. The apparatus of claim 1, wherein the controller is configured to:

monitor the output current of the inverter;

calculate a rate of change of the monitored output current;

compare the calculated rate of change of the monitored output current to a startup output current rate of change threshold; and determine that the component startup criterion has been met if the calculated rate of change of the monitored output current exceeds the startup output current rate of change threshold.

13. The apparatus of claim 1, wherein the controller is configured to:

receive a startup signal; and determine whether the component startup criterion has been met based on the startup signal.

14. A transport refrigeration system comprising the apparatus of claim 1, wherein the AC electrical component is configured to drive a compressor of the transport refrigeration system.

15. The apparatus of claim 1, wherein when operating the inverter in the protected startup mode, the controller is operative to:

monitor the output current of the inverter;

control the output frequency and the output voltage, based on the monitored output current.

16. The apparatus of claim 1, wherein when operating the inverter in the protected startup mode, the controller is operative to:

monitor the output current of the inverter;

control the output frequency and the output voltage to maintain the monitored output current at or below an upper output current threshold.

17. The apparatus of claim 16, wherein when operating the inverter in the protected startup mode, the controller is operative to:

control the output frequency and the output voltage to maintain the monitored output current at or below the upper output current threshold and within a target output current range of the upper output current threshold.

18. The apparatus of claim 1, wherein when operating the inverter in the protected startup mode, the controller is operative to:

monitor the output current of the inverter;

calculate an output power based on the output voltage and the monitored output current; and control the output frequency and the output voltage to maintain the calculated output power at or below an upper output power threshold.

19. The apparatus of claim 18, wherein when operating the inverter in the protected startup mode, the controller is operative to:

control the output frequency and the output voltage to maintain the calculated output power at or below the upper output power threshold and within a target output power range of the upper output power threshold.

20. The apparatus of claim 1, wherein when operating the inverter in the protected startup mode, the controller is operative to:

record a time elapsed since the component startup criterion was determined to have been met; and control the output frequency and the output voltage according to a predetermined startup scheme which defines a relationship between:

the output voltage and the recorded time elapsed, and the output frequency and the recorded time elapsed.

21. The apparatus of claim 2, wherein when operating the inverter in the protected startup mode, the controller is operative to:

record a time elapsed since the component startup criterion was determined to have been met; and control the output frequency and the output voltage according to a predetermined startup scheme which defines a relationship between:

the output voltage and the recorded time elapsed, and the output frequency and the recorded time elapsed, and wherein the relationship between:

the output voltage and the recorded time elapsed defined by the predetermined startup scheme is such that the output voltage increases as the time elapsed increases; and the output frequency and the recorded time elapsed defined by the predetermined startup scheme is such that the output frequency increases as the time elapsed increases.

\* \* \* \* \*